United States Patent
Gerding (10) Patent No.: US 10,700,438 B2
(45) Date of Patent: Jun. 30, 2020

(54) GUIDE ELEMENT FOR AN ANTENNA AND METHOD FOR PRODUCING SUCH GUIDE ELEMENT

(71) Applicant: KROHNE Messtechnik GmbH, Duisburg (DE)

(72) Inventor: Michael Gerding, Bochum (DE)

(73) Assignee: KROHNE MESSTECHNIK GMBH, Duisburg (DE)

(*) Notice: Subject to any disclaimer, the term of this patent is extended or adjusted under 35 U.S.C. 154(b) by 0 days.

(21) Appl. No.: 15/471,089

(22) Filed: Mar. 28, 2017

(65) Prior Publication Data

US 2017/0279201 A1    Sep. 28, 2017

(30) Foreign Application Priority Data

Mar. 28, 2016   (DE) .................. 10 2016 105 647

(51) Int. Cl.
*H01Q 13/00*   (2006.01)
*H01Q 15/08*   (2006.01)
(Continued)

(52) U.S. Cl.
CPC .......... *H01Q 15/08* (2013.01); *G01F 23/284* (2013.01); *H01Q 1/225* (2013.01); *H01Q 9/0485* (2013.01); *H01Q 15/10* (2013.01); *H01Q 19/06* (2013.01)

(58) Field of Classification Search
CPC ........ H01Q 17/00; H01Q 1/225; H01Q 15/14; H01Q 1/34; H01Q 1/36; H01Q 15/0086;
(Continued)

(56) References Cited

U.S. PATENT DOCUMENTS 5,117,240 A * 5/1992 Anderson .......... H01Q 13/0275
                                                    343/786
7,642,978 B2   1/2010 Braunstein et al.
(Continued)

FOREIGN PATENT DOCUMENTS

CN   104638377 A   5/2015
EP   2 105 991 A1   9/2009

OTHER PUBLICATIONS

Jianjia Yi, Shah Nawaz Burokur, Gerard-Pascal Piau and Andre De Lustrac, Restoring In-Phase Emissions From Non-Planar Radiating Elements Using a Transformation Optics Based Lens, Applied Physics Letters, AIP Publishing LLC, 107, 2015, pp. 024101-1-024101-5.

(Continued)

*Primary Examiner* — Linh V Nguyen
(74) *Attorney, Agent, or Firm* — David S. Safran; Roberts Calderon Safran & Cole, P.C.

(57) ABSTRACT

The invention relates to a guide element for an antenna for a fill level meter, wherein the guide element is composed of a dielectric material and is used for forming, guiding and emitting electromagnetic radiation. The guide element has a permittivity course that changes over the spatial expansion of the guide element for specifically forming the electromagnetic radiation, the course being implemented by a spatial distribution of the material density of the dielectric material, wherein the material density is defined as one portion of dielectric material per elementary cell of a given size. Furthermore, the invention relates to a method for producing a guide element.

20 Claims, 6 Drawing Sheets

(51) Int. Cl.
*G01F 23/284* (2006.01)
*H01Q 19/06* (2006.01)
*H01Q 15/10* (2006.01)
*H01Q 1/22* (2006.01)
*H01Q 9/04* (2006.01)

(58) Field of Classification Search
CPC .............. G01F 23/284; G01F 25/0061; G01F 23/0076; G01F 23/263; G01F 23/00
USPC ........................................ 343/783, 785, 753
See application file for complete search history.

(56) References Cited

U.S. PATENT DOCUMENTS

| | | | | |
|---|---|---|---|---|
| 8,242,965 | B2* | 8/2012 | Gerding | G01F 23/284 343/753 |
| 9,000,775 | B2* | 4/2015 | Chen | H01Q 19/08 324/637 |
| 9,110,165 | B2* | 8/2015 | Feisst | G01F 23/284 |
| 9,207,357 | B2 | 12/2015 | Steinhardt et al. | |
| 9,306,265 | B1* | 4/2016 | Hossein-Zadeh | H01P 7/00 |
| 9,395,219 | B1* | 7/2016 | Dow | H04L 67/18 |
| 9,519,104 | B1* | 12/2016 | Mullen | G02B 6/1225 |
| 10,224,597 | B2* | 3/2019 | Blodt | H01Q 15/08 |
| 10,371,556 | B2* | 8/2019 | Feisst | G01S 13/88 |
| 2006/0053880 | A1* | 3/2006 | Taylor | G01F 23/0069 |
| 2009/0034292 | A1* | 2/2009 | Pokrovskiy | G02B 6/0028 362/617 |
| 2009/0212996 | A1* | 8/2009 | Chen | G01F 23/284 342/124 |
| 2009/0262038 | A1* | 10/2009 | Gerding | G01F 23/284 343/783 |
| 2016/0089840 | A1 | 3/2016 | Albert et al. | |
| 2017/0010142 | A1* | 1/2017 | Feisst | G01S 7/03 |

OTHER PUBLICATIONS

Seng Fatt Liew et al., Photonic Band Gaps in 3D Network Structures With Short-Range Order, arXiv:1108.1090v1 [physics.optics] Aug. 4, 2011, pp. 1-6.

C.R. Garcia et al., 3D Printing of Anisotropic Metamaterials, Progress in Electromagnetics Research Letters, vol. 34, pp. 75-82, 2012.

Shiyu Zhang et al., 3D Pringed Flat Lens for Microwave Applications, Submitted to Loughborough University's Institutional Repository, 2015, Presented at the Antennas and Propagation Conference (LAPC2015), Loughborough, Nov. 2-3, 2015; 4 pages.

Min Liang et al., A 3-D Luneburg Lens Antenna Fabricated by Polymer Jetting Rapid Protyping, IEEE Transactions on Antennas and Propagation, vol. 62, No. 4, Apr. 2014, pp. 1799-1807.

A. Bisognin et al., A 120 GHz 3-D Printed Plastic Elliptical Lens Antenna With an IPD Patch Antenna Source, 2014 IEEE International Conference on Ultra-WideBand (ICUWB), 978-1-4799-5396-7/14/ $31.00 © 2014 IEEE, pp. 171-174.

David A. Roper et al., Additive Manufacturing of Graded Dielectrics, Smart Materials and Structures, 23 (2014) IOP Publishing Ltd., Printed in the U.K., pp. 1-9.

* cited by examiner

GUIDE ELEMENT FOR AN ANTENNA AND METHOD FOR PRODUCING SUCH GUIDE ELEMENT

BACKGROUND OF THE INVENTION

Field of the Invention

The invention relates to a guide element for an antenna for a fill level meter, wherein the guide element consists of a dielectric material and is used for forming, guiding and emitting electromagnetic radiation. Furthermore, the invention relates to a method for producing such a guide element.

Description of Related Art

Antennae, for which the guide element being discussed here is to be used, are, for example, used in fill level meters operating according to the radar principle. In addition to the guide element, an antenna also has a supply element. The supply element emits electromagnetic radiation and impinges the guide element with the electromagnetic radiation, which then forms, guides and emits the radiation.

The guide element itself, which can be, for example, a lens, is produced of a dielectric material. The use of a plastic, for example PEEK (polyetheretherketone), is suitable for the production of lenses. The dielectric property of the material used is characterized by its dielectric conductivity, which is also called dielectricity or permittivity.

Normally, the materials used for the guide element have a homogeneous distribution of their dielectric properties, for example in that the material is simply employed homogeneously. Thus, the advantage of easy producibility and reproducibility results in manufacture. The forming of the electromagnetic waves supplied into the guide element, then guided in the guide element and emitted from the guide element into free space then takes place essentially in the emitting section of the guide element, i.e., in the transition area between the dielectric material of the guide element and the free space. This transition area simultaneously represents a step-like change of the permittivity and causes a step-like refraction of the electromagnetic waves. By specifically geometrically designing the emitting section, this effect can be used to form smooth wave fronts (see e.g. EP 2105991 A1 or DE 102008008715 A1).

However, it is necessary in several cases to implement different layers of dielectric properties, for example in order to cause an overall greater refraction than can be caused with only one single boundary layer. This generally takes place by applying different dielectric materials layer by layer, which assumes that a respective material availability is given. Furthermore, arbitrary materials cannot be joined to one another, but rather the mechanical, thermal and chemical properties of the materials have to be taken into account when joining different materials.

Such a production can, accordingly, be complicated and expensive, since it consists of many operation steps and a choice of materials that have to be compatible with one another.

Furthermore, the disadvantage arises in the use of layers that areas of the guide element that are not arbitrarily formed and, in particular, areas located within the guide element can have another permittivity.

SUMMARY OF THE INVENTION

Thus, the object of the invention is to provide a guide element in which the disadvantages known from the prior art can be resolved—at least to the greatest possible extent. Furthermore, the object of the invention is to provide a method for producing a guide element.

The object is initially and essentially achieved by the guide element according to the invention in that the guide element has a permittivity course that changes over the spatial expansion of the guide element for specifically forming the electromagnetic radiation, the course being implemented by a spatial distribution of the material density of the dielectric material, wherein the material density is defined as one portion of dielectric material per elementary cell of a given size.

The guide element according to the invention thus initially has the advantage that is is produced of only one material. In order to vary the permittivity, the material density of the one dielectric material is changed instead of using a different material. Thus, all disadvantages that can be caused by joining different materials to one another are eliminated. Neither thermal nor chemical nor mechanical properties of the material used have to be taken into account since no second material with different properties is used.

Furthermore, the guide element according to the invention has the advantage that the material density of the dielectric material can be changed over the entire spatial expansion of the guide element. Thus, the material density can be different in an area within the guide element than in an adjacent area or in an area that is located outside of or on the surface of the guide element. In the guide elements according to the invention, the forming of electromagnetic waves can thus already be carried out completely unconstrained in the guide element and not later at the outer boundary of the guide element. If the material density of the dielectric material changes continuously, the phase front of the guided electromagnetic waves can be practically continuously formed, it is not refracted on hard boundaries, but is bent into the desired form at quasi-continuous transitions.

According to the invention, the material density is defined as one portion of dielectric material per elementary cell of a given size.

The portion of material, here, is defined by the volume portion of material in the volume of the elementary cell and is averaged over the entire elementary cell. An elementary cell, here, is initially an imaginary volume area of the guide element, in which a permittivity is implemented. The changing permittivity course is implemented by a plurality of adjacently arranged elementary cells of different permittivity. An elementary cell does not have to agree with an implemented material structure.

The guide body or a part of the guide body is divided, i.e., into areas—as an Average—of the same permittivity by the elementary cells. If same elementary cells are used, they form a regular filling of the space of the volume taken by the guide element.

The guide element, or at least parts of the guide element, is or are divided into a plurality of elementary cells. Hereby, the elementary cells do not all have to have the same size. It is also possible—and in some situations even advantageous—that elementary cells of different sizes are arranged next to one another or the size of the elementary cell varies depending on the material density and/or arrangement of the material in the elementary cell. This is the subject matter of preferred exemplary embodiments.

The material can be arranged differently in an elementary cell, wherein the arrangement of the material can vary from one elementary cell to another. In the following, the arrangement of the material in one, single elementary cell is observed.

One design of the guide element according to the invention is characterized in that the material is arranged in an irregular structure. When discussing an irregular structure, what is meant is that the structure has no periodicity and no regularity to be found in the structure. An example for an irregular structure is a sponge-like or porous structure. The material in the elementary cell can, thus, for example, have a predetermined porosity. Hereby, the material can have an open porosity, i.e., hollow spaces that are connected to one another. However, the material can also have a closed porosity, i.e., hollow spaces that are not connected to one another. The hollow spaces are statistically or randomly distributed in the material, so that an irregular structure is provided.

In one design of the guide element according to the invention, it is provided that the material is arranged in a regular structure at least in a part of the elementary cells. A regular structure can, for example, be implemented by building a sequence of polyhedrons, i.e., for example by building a sequence of cubes or by building a sequence of pyramids or prisms. Hypothetically, each polyhedron can be placed in a sequence with other polyhedrons without any gaps being formed so as to implement a complete filling of space. Of course, it is also possible to use several spatial bodies of different shapes that form a complete spatial partitioning. The material density, hereby, can by varied, on the one hand, in the choice of polyhedron and, on the other hand, by varying the wall thickness and/or the size of the chosen polyhedron.

It should be taken into account that the polyhedron is hollow on the inside. A further implementation of an organized structure can be created in that a two-dimensional basic structure is taken as a basis, which is then "built up" in the third spatial direction, i.e., for example a honeycomb structure that is built up to be hollow pillars. For example, all oblique, rectangular or square basic structures are suitable as two-dimensional basic structure.

In the choice of structures and the size of structures, both as regular and as irregular, it is preferred to take into account that the structures have no spatial periodicity that influence the radiation in such a manner that, for example, effects of interference occur. A forming of the radiation should only take place due to the varied material density and, thus, the varied effective permittivity.

Elementary cells, in which the material is arranged in a regular manner, can be located adjacent to elementary cells having an irregular structure.

For the next characteristics, the entire guide element is to be taken into consideration and no longer just one elementary cell.

A preferred design of the guide element according to the invention is characterized in that the permittivity course is steady at least over a part of the spatial expansion of the guide element. The permittivity can, for example, increase linearly or decrease linearly over a part of the spatial expansion. It is also possible to have an exponential increase or decrease of the permittivity over a part of the spatial expansion. According to the invention, gradients of the permittivity can be implemented in this manner. This can be implemented, for example, by a permittivity course of the material. The permittivity course can respond to any continuous function. The guide element according to the invention thus has the advantage that any permittivity courses can be implemented.

A further design of the guide element according to the invention is characterized in that the permittivity course is unsteady at least over a part of the spatial expansion of the guide element. In this manner, for example, steps and abrupt transitions of the permittivity course can be implemented without having to vary the material used.

A combination of both steady and unsteady areas of permittivity is easily possible for the guide element as a whole.

In an advantageous design of the guide element, it is provided that the irregular structure or the regular structure is a Voronoi tessellation or a Delaunay tessellation of the space of the elementary cells. The tessellations mentioned are understood in the art and allow for a partitioning of an n-dimensional—and thus also three-dimensional—space on the basis of a given point distribution. In the case of the Voronai tessellation, each point is the center of a Voronoi cell surrounding it. For each Voronoi diagram, a Delaunay diagram exists that is also suitable for advantageous partitioning of the space, i.e., of the space defined by one elementary cell or by several elementary cells.

The Voronoi cell of an observed, given central point comprises all of those points of the entire space that are closer to the observed, given central point than to any other given central point. Due to this principle of formation, a very compact spatial partitioning is created. Advantageously, the Voronoi partitioning of an elementary cell takes place by specifying a statistically random point distribution. Thus, it is ensured that the walls of the created Voronoi cells are also statistically randomly oriented. In order to achieve the desired permittivity, then, for example, the density of the given central points can be changed to correspond to the desired permittivity value. A high permittivity value is thus implemented by a high Voronoi cell density within one elementary cell. In this concept, the wall thicknesses can remain as they are. In an alternative concept, the average point density of the Voronoi centers remains essentially constant, however, the wall thickness is changed to correspond to the desired permittivity value.

An advantageous design of the invention is thus based on the spatial distribution of the material density of the dielectric material being implemented by varying the wall thickness of the cells, of which the Voronoi partitioning or Delaunay partitioning of the elementary cells consist.

An alternative advantageous design provides that the spatial distribution of the material density of the dielectric material is implemented by varying the density of the cells, of which the Voronoi partitioning or Delaunay partitioning of the elementary cells consist, while retaining the wall thickness of the cells. Both above described variations can be combined.

According to a preferred design of the guide element, it is provided that the size of the elementary cell in one volume range is dependent on the gradient of the permittivity course in this volume range. This design principle results from the knowledge that fast spatial changes of the permittivity have to be encountered constructively in a different manner than slow spatial changes of the permittivity. Subsequently, in particular, it has been acknowledged that it is practical to consider the maximum gradient of the permittivity course in this volume range and not any random gradient of the permittivity course in a volume range. For this, a spatial coordinate system is formed, for example an orthogonal or hexagonal coordinate system, and the gradient of the permittivity course is defined in every spatial direction. The maximum gradient in this volume element or, respectively, in the elementary cell of the guide element defines the size of the elementary cell. The following illustrates possible principles for carrying this out.

According to a particularly advantageous design of the guide element, it is provided that the size of the elementary cell is chosen to be the smallest for the volume range that has the largest (maximum) gradient of the permittivity course and/or that the size of the elementary cell is chosen to be the largest for the volume range that has the smallest (minimum) gradient of the permittivity curve. Thus, a fast spatial change of permittivity is implemented by a fast change in elementary cells, so that the transition between areas of highly changing permittivity is, nevertheless, implemented quasi-continuously.

According to a further advantageous design, the guide element is characterized in that the size of an elementary cell, in the statistical mean, averaged over the volume of the guide element, is larger where the gradient of the permittivity course is smaller and the size of an elementary cell, in the statistical mean, averaged over the volume of the guide element, is smaller where the gradient of the permittivity course is larger. This is implemented in a very particularly preferred design of the guide element so that the maximum spatial permittivity gradient is translated into a proportional spatial point density and the points are used as development points for a three-dimensional Voronoi partitioning of the volume of the guide element.

Preferably, the guide element is produced using a generative manufacturing method. In the generative manufacturing method, which is commonly referred to as a 3D printing method, the object to be produced is produced layer by layer. The production using a generative manufacturing method is suitable for the guide element according to the invention, since a material density distribution can be implemented in a simple manner, also, in particular on the inside of the guide element.

The invention also relates to a method for producing a guide element for an antenna for a fill level meter.

The method according to the invention is characterized in that, first, a permittivity course is provided in the spatial expansion of the guide element, that, then a corresponding material density distribution corresponding to the given permittivity course is specified, that, then a structure is specified that implements the material density distribution and that, then the structure is produced using a generative manufacturing method.

The method according to the invention allows for the guide elements according to the invention to be produced in a particularly effective manner. In a first method step, the permittivity distribution is given in the spatial expansion of the guide element. This can, for example, have a steady course or an unsteady course, i.e., for example abrupt steps in the permittivity are possible. Since the permittivity is dependent on the material density, a material density distribution corresponding to the permittivity course is specified in a second step. This material density distribution is carried out by different structures, for example by different porosities in the material. After specifying the structure carrying out the material density distribution, the structure and, with it, the guide element, is produced using a generative manufacturing method.

In choosing the generative manufacture method, the previously specified structure is to be taken into account. Not all generative manufacturing methods are suitable for all structures. It is also important to consider the choice of material of the guide element, since not every generative manufacturing method is suitable for every material. The generative manufacturing methods have in common that the object to be produced, i.e., presently the guide element, is produced layer by layer. The three-dimensional object is divided into two-dimensional layers that are then applied on one another. It should be taken into account when choosing the structure that neither the structure itself nor the primary structures in the structure influence the propagation of the radiation. An influence on the electromagnetic radiation should only take place based on the varying material density and, with it, the varying permittivity. For example, it is suitable to rotate a structure at a small angle layer by layer, i.e., application skewed to one another.

A preferred implementation of the method according to the invention is characterized in that for specifying the structure implementing the material density distribution, the guide element is divided into elementary cells. The size of adjacent elementary cells can hereby vary among one another. The choice of the size of the elementary cells can hereby take place in different manners. A particularly preferred implementation of the method according to the invention provides that the size of the elementary cell in one volume range is dependent on the gradient of the permittivity course in this volume range, in particular on the maximum gradient of the permittivity course in this volume range.

In the method according to the invention, a particularly preferred implementation is hereby provided in that the size of the elementary cell is chosen to be the smallest for the volume range that has the greatest gradient of the permittivity course and/or that the size of the elementary cell is chosen to be the greatest for the volume range that has the smallest gradient of the permittivity course.

Furthermore, a preferred implementation of the method according to the invention is characterized in that that size of an elementary cell, in the statistical mean, averaged over the volume of the guide element, is chosen to be larger where the gradient of the permittivity course is smaller and the size of an elementary cell, in the statistical mean, averaged over the volume of the guide element, is chosen to be smaller where the gradient of the permittivity course is larger. Hereby, an approach is preferable in which the size of the elementary cells is chosen so that the maximum spatial permittivity gradient is translated into a proportional spatial point density and the points are used as development points for a three-dimensional Voronoi partitioning of the volume of the guide element.

The advantages of the preferred implementations of the method according to the invention, which relate to the choice of the size of the elementary cells, have already been described for the guide element and apply accordingly.

In detail, there are various possibilities for designing and further developing the guide element and the method according to the invention as will be apparent from the description of preferred embodiments in conjunction with the accompanying drawings.

DETAILED DESCRIPTION OF THE INVENTION

Figure 1:
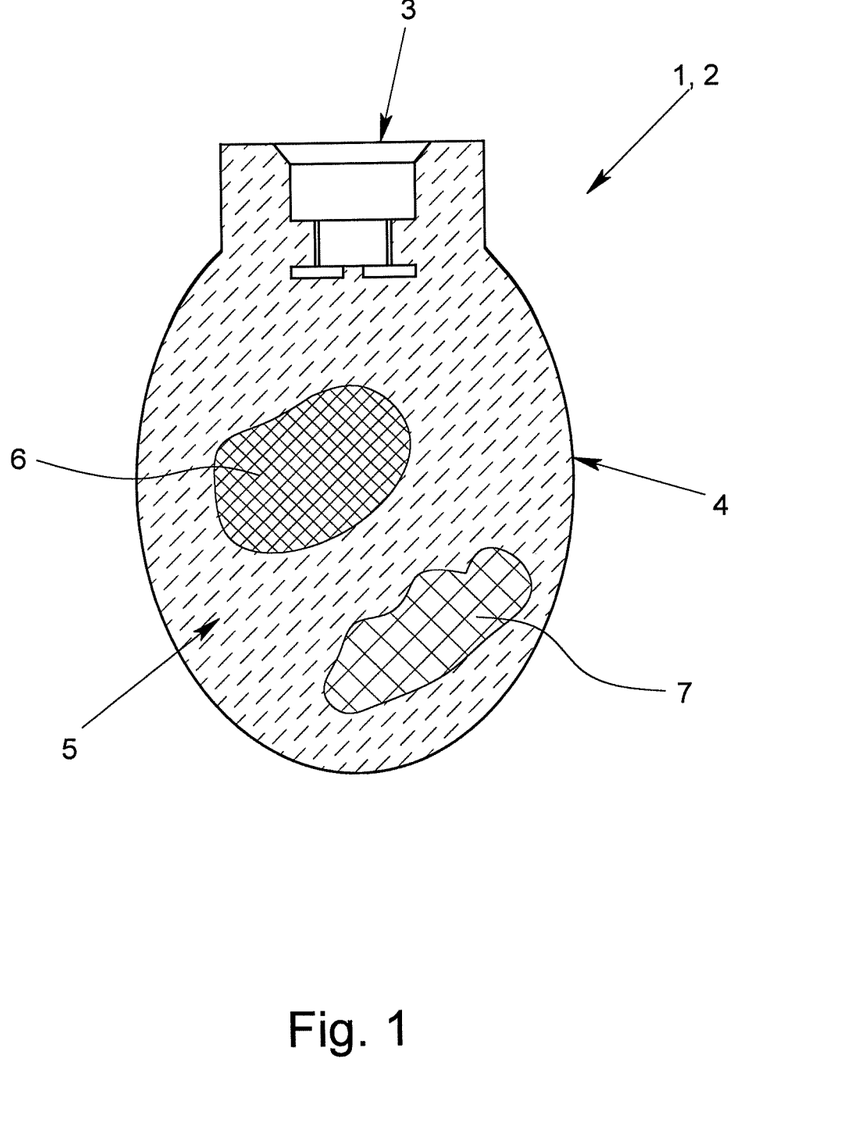
FIG. 1 is a guide element according to the invention in the form of an elliptical lens in accordance with aspects of the invention.

A guide element 1 according to the invention in the form of an elliptical lens 2 of an antenna is illustrated in FIG. 1. The lens 2 is impinged with electromagnetic radiation by a supply element 3, the radiation then being emitted via the lens surface 4. The lens 2 is produced of a dielectric material. There are areas 6, 7 located in the lens 2, in which the material density differs from the material density of the rest of the lens 2. The lens 2 has a spatial distribution of the material density over its spatial expansion. The permittivity of the dielectric material is dependent on the material density, so that the lens has a changing permittivity course over its spatial expansion. The material density is defined by one portion of material 5 per elementary cell 8 of a given size.

The material can be arranged differently in the elementary cells. In FIG. 2a to FIG. 2e, cross sections through elementary cells, having a rectangular cross section, are illustrated. The cross section of the elementary cell does not have to be rectangular, moreover, the choice of the shape of the elementary cell is arbitrary.

Figure 2A:
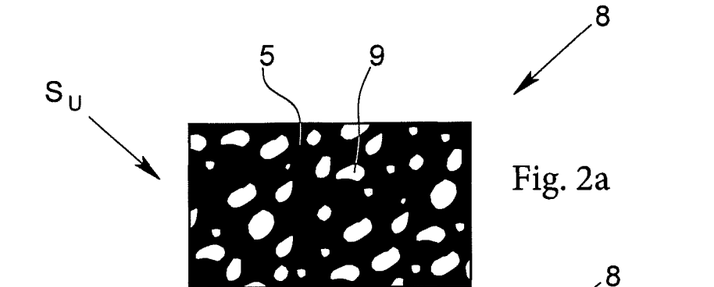
FIG. 2a is a first example of an elementary cell, in which the material is arranged in an irregular structure in accordance with aspects of the invention.

FIG. 2a shows a first example of an elementary cell 8, in which the material 5 is arranged in an irregular structure. The material 5 hereby has a closed porosity, i.e., has hollow spaces 9 that are not connected to one another. The hollow spaces 9 have different sizes and are randomly arranged in the material 5.

Figure 2B:
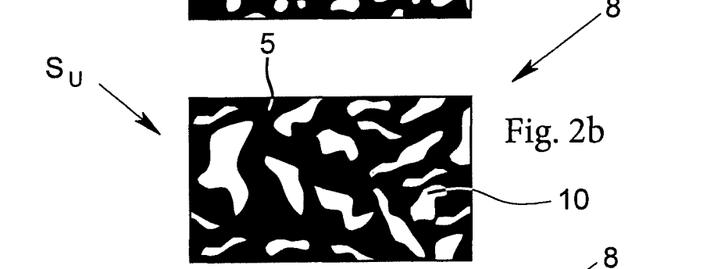
FIG. 2b is a second example of an elementary cell, in which the material is arranged in an irregular structure in accordance with aspects of the invention.

FIG. 2b shows a further example of an elementary cell 8, in which the material 5 is arranged in an irregular structure. Here, worm-like hollow spaces 10 are implemented in the material 5. The hollow spaces 10 are also randomly arranged in the material 5, so that no higher organized structure is created by the hollow spaces 10.

Figure 2C:
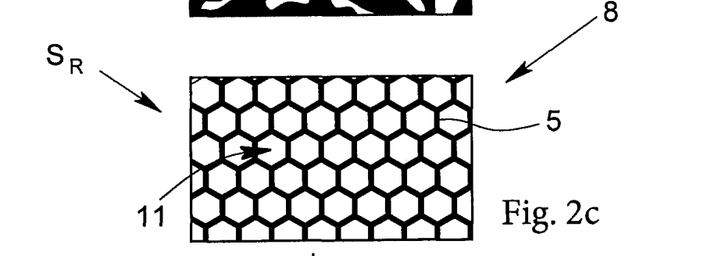
FIG. 2c is a first example of an elementary cell, in which the material is arranged in a regular structure in accordance with aspects of the invention.

As a first example for an arrangement of the material 5 in a regular structure, the material 5 in FIG. 2c is arranged in the form of honeycombs 11. In a regular structure, it is taken into account that the structures are implemented in one size, which does not lead to an undesired structurally caused influence of the electromagnetic radiation.

Figure 2D:
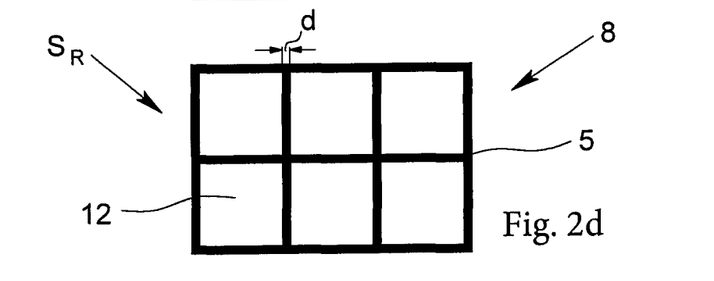
FIG. 2d is a second example of an elementary cell, in which the material is arranged in a regular structure in accordance with aspects of the invention.
Figure 2E:
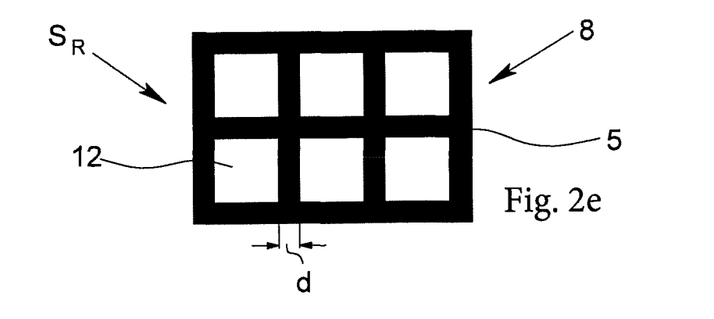
FIG. 2e is a third example of an elementary cell, in which the material is arranged in a regular structure in accordance with aspects of the invention.

FIGS. 2d and 2c show the cross section of an elementary cell 8, in which the material 5 is arranged in the form of a sequence built of cubes 12 and thus has a regular structure. The material density can, for example, be influenced by the thickness d of the cube walls. In this manner, the chosen structure in the elementary cells is the same in FIGS. 2d and 2e, however, the elementary cells in FIG. 2e have a higher material density than the elementary cells in FIG. 2d.

The illustrated structures can be implemented in a particularly suitable manner using a generative manufacturing method. The choice of the manufacturing method is hereby dependent on the choice of material and the chosen structure.

Figure 3:
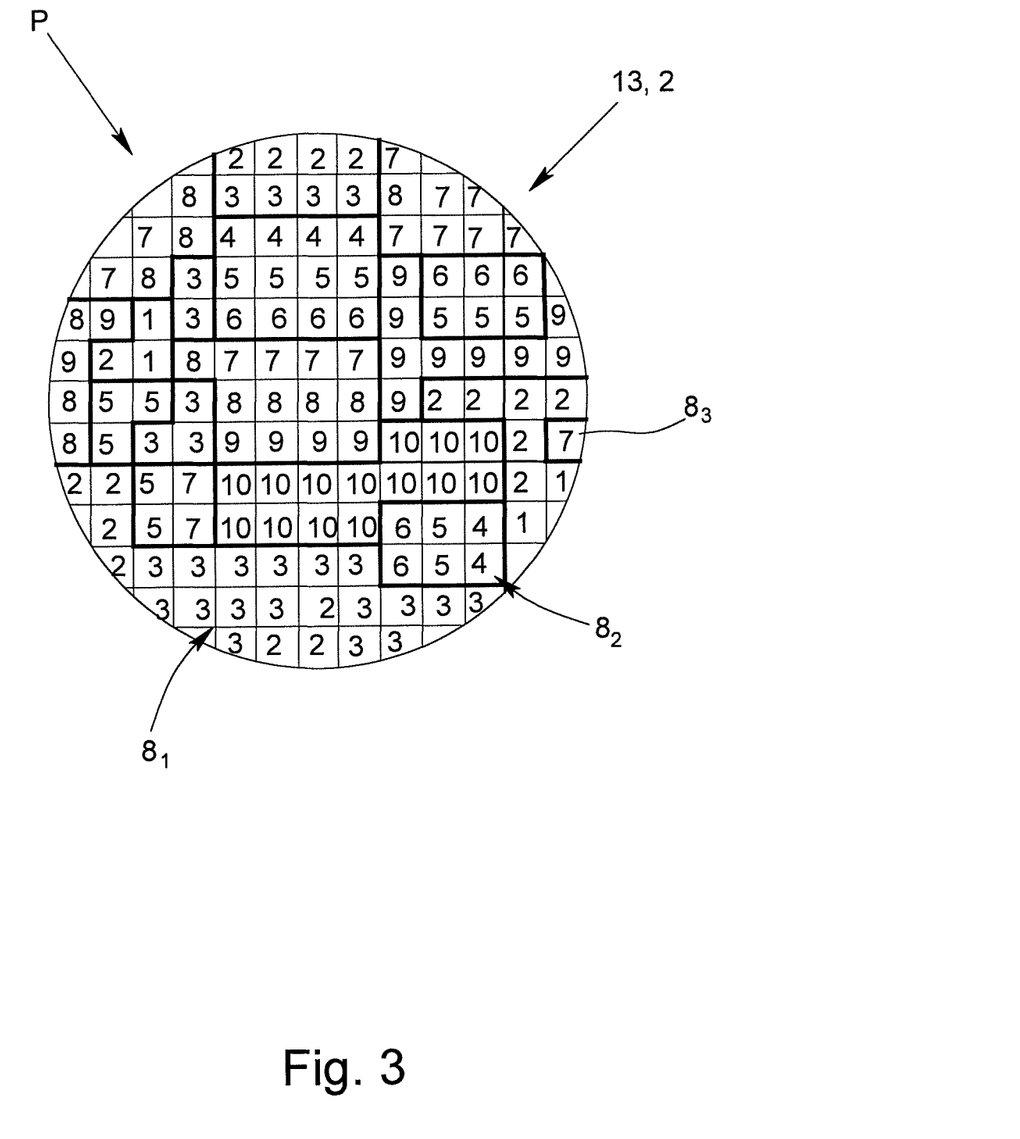
FIG. 3 is a cross section through a lens for demonstrating a steady permittivity course in sections of the lens in accordance with aspects of the invention.

A cross section 13 of a lens 2 is illustrated in FIG. 3. The illustration is schematic and is used for demonstrating the permittivity course P in the lens. For this, the lens is divided into squares over the cross section. The numbers in the squares stand for a permittivity value, wherein the number 10 represents the highest possible permittivity and the number 1 represents the lowest possible permittivity. In the middle, at the bottom, the lens 2 has an area of high as possible permittivity, the squares are marked with a 10. The permittivity decreases to the upper edge of the lens 2 in the figure. Hereby, the permittivity in this area chronicles a linear course from the lower middle up to the upper edge of the lens. This distribution of the permittivity is an example of a continuous, steady permittivity course in parts of the spatial expansion of the lens 2.

Areas are also shown, which are characterized by steps in the permittivity. The permittivity in the right, lower area of the lens 2 shown in the figure decreases from a permittivity value of 10 directly to a permittivity value of 2. The course is only shown in an exemplary manner in a two-dimensional cross section. Seen over the entire lens, the permittivity course P can take on any arbitrary course.

A few elementary cells 8 are further illustrated in FIG. 3. The elementary cells 8 are shown with bold outlines. It can be seen that the elementary cells 8 have different sizes. The size of the respective elementary cell 8 is hereby chosen in dependence on the gradient of the permittivity course P.

The elementary cell $8_1$ is the largest illustrated elementary cell. Within the elementary cell $8_1$, the permittivity varies between 3 and 2, thus the gradient is very small, so that a large elementary cell can be chosen. The elementary cell $8_2$ has a smaller size. Within the elementary cell $8_2$, the permittivity varies between 6 and 4, so that the gradient within the elementary cell $8_2$ is also small. However, this elementary cell $8_2$ is surrounded on its upper side by areas of a permittivity of 10. Here, the larger gradient exists, so that the area of the permittivity of 10 is not included in the unit cell $8_2$. The elementary cell $8_2$ has a permittivity of 7 at the right edge of the lens 2. In the surroundings, however, the permittivity is much smaller with values of 1 and 2, so that a large gradient exists. The size of the elementary cell $8_3$ is accordingly chosen to be very small.

Figure 5A:
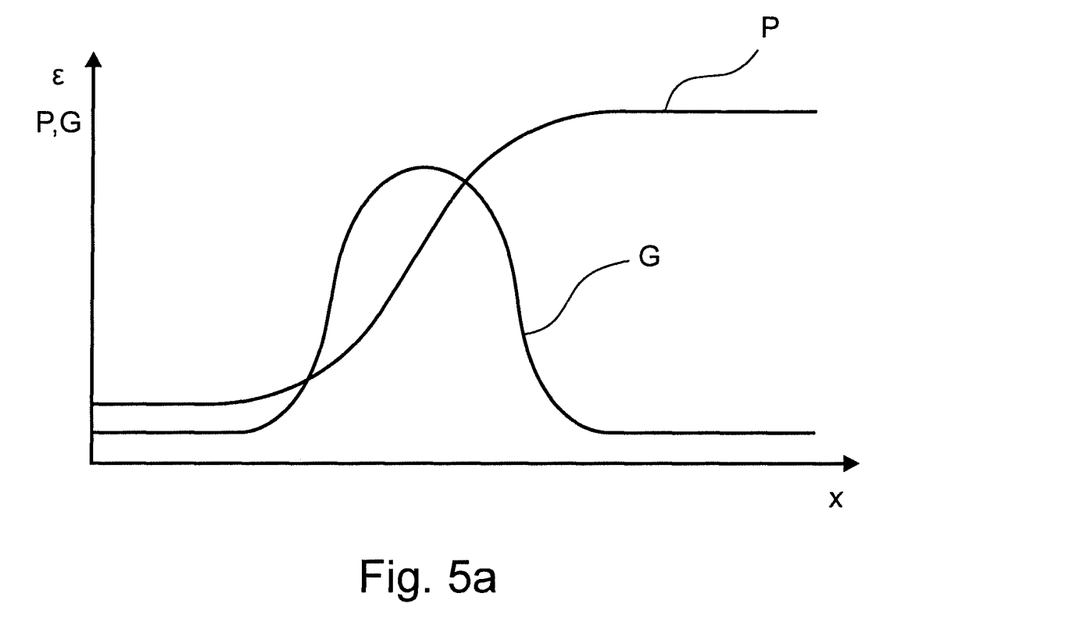
FIGS. 5a and 5b show an embodiment with varying elementary cell size in dependence on the gradient of the permittivity course in accordance with aspects of the invention.
Figure 6A:
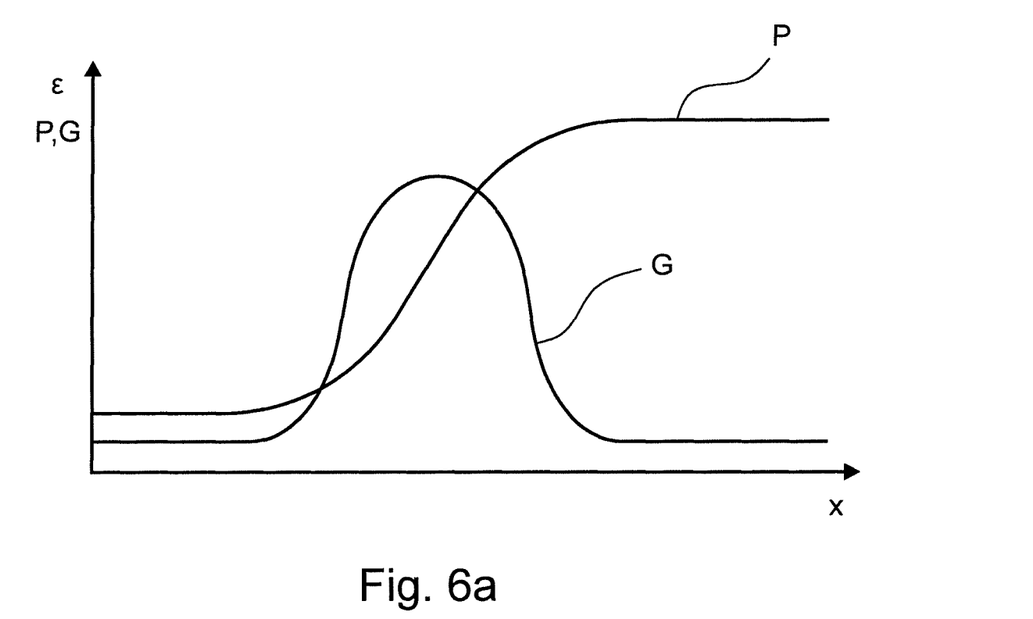
FIGS. 6a and 6b show an embodiment with structure cells that, in the statistical mean, are greater in larger elementary cells than in smaller elementary cells in accordance with aspects of the invention.

FIGS. 5a and 6a show an identical permittivity course P in a guide element that is not illustrated in detail, the course being independent on only one location coordinate x. The permittivity ($\varepsilon$) initially starts on a low plateau for small x-values, then increases steeply in a middle area and reaches a plateau for large x-values at a high permittivity value. The course belonging to the permittivity course P of the gradient G of the permittivity course P is also shown in a qualitative manner.

The embodiment shown in FIGS. 5a, 5b, 6a, and 6b is used for explaining the formation principle for an implemented irregular structure $S_U$ within elementary cells 8 of different sizes.

Figure 5B:
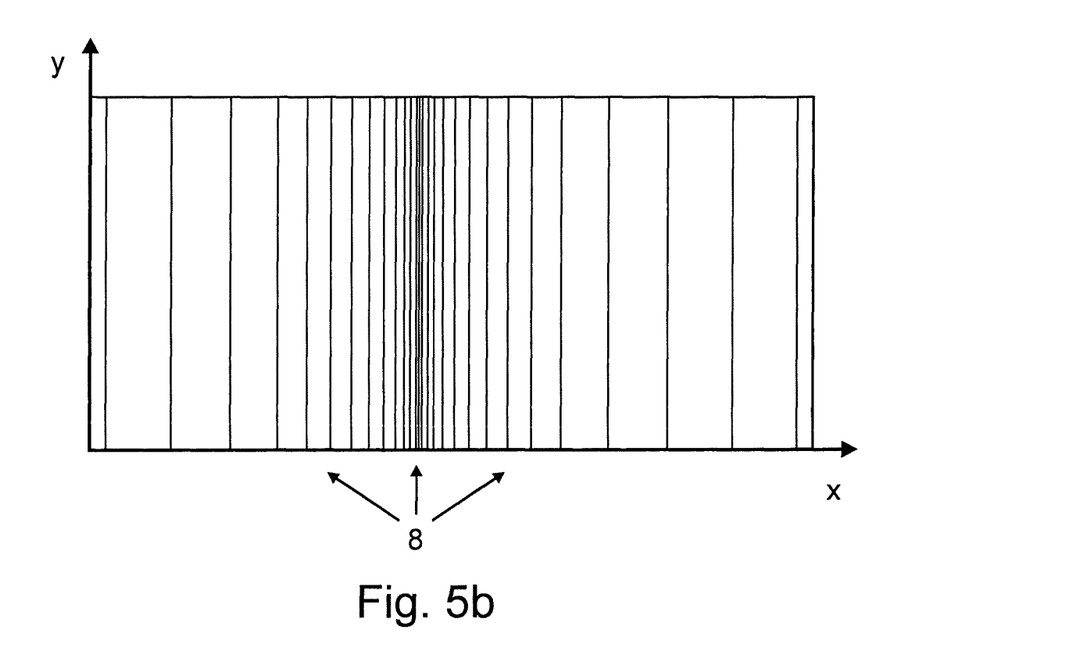

It can be seen in FIG. 5b, that the size of the elementary cells 8 in one volume range, of which only the two-dimensional extension over the x- and y-axes is shown, is dependent on the gradient G of the permittivity course P in the volume range. The gradient G is also sketched in FIGS.

5a and 6a for a better understanding of the principle, these are not mathematically exact curves.

FIG. 5b shows that the size of the elementary cells 8 is chosen to be the smallest for the volume range that has the largest gradient G of the permittivity course P (average x-values) and that the size of the elementary cells 8 is chosen to the be the largest for the volume range that has the smallest gradient G of the permittivity course P (small and large x-values). In this manner, it is sensibly ensured that large local changes of the permittivity course are tapped, finely graduated, and implemented in the guide element.

Figure 6B:
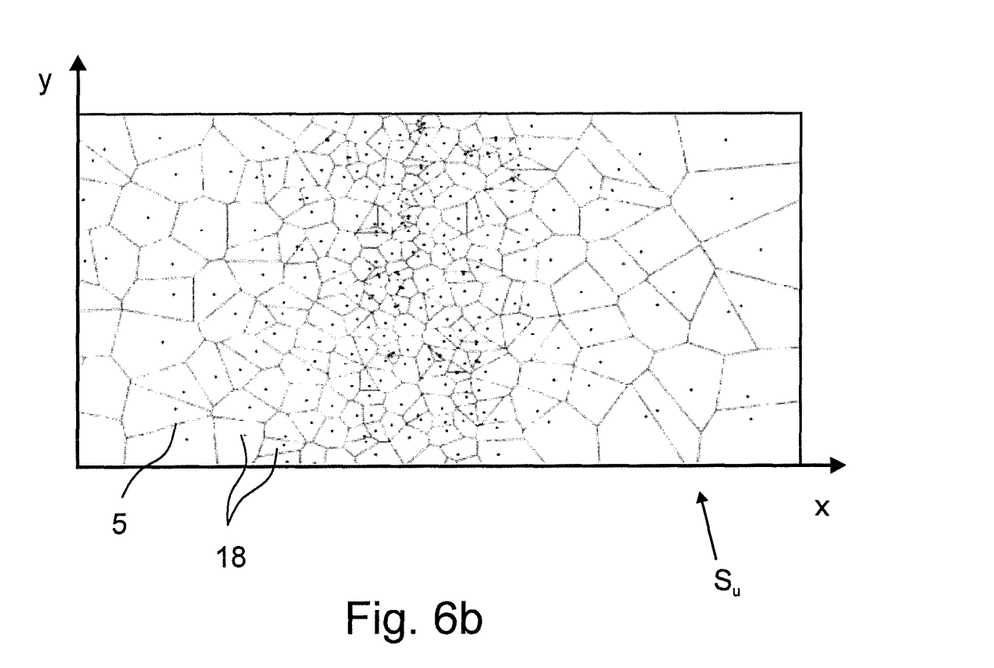

FIG. 6b shows the structural implementation of the spatial distribution of the material density corresponding to the permittivity course in that an irregular structure $S_U$ is implemented by a spatial Voronoi tessellation of the elementary cells 8. Here, the spatial distribution of the material density of the dielectric material 5 is implemented by varying the density of the structure cells 18, of which the Voronoi tessellation of the elementary cells 8 consist, while retaining the wall thickness of the structure cells. The coordinates of the centers of the Voronoi cells shown by points can be given by a numerical random process. In this manner, corresponding predetermined density distribution of stochastic point clouds can be generated.

In the present case, the irregular structure $S_U$ is formed by adjacent structure cells 18, these being Voronoi cells. The size of the structure cells 18 changes in dependence on the size of the elementary cells 8, in which the respective structure cells 18 are located. The structure cells 18, in statistical mean, are larger in large elementary cells 8 than the structure cells 18 in small elementary cells 8.

Figure 4:
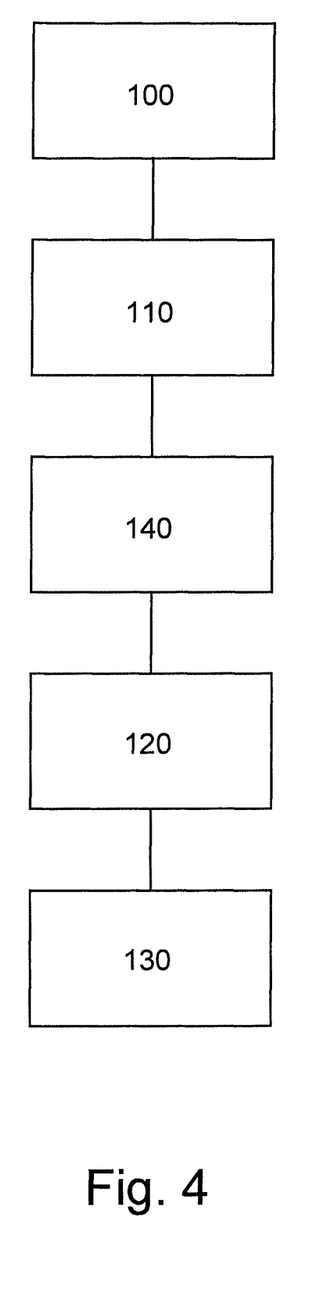
FIG. 4 is a flow chart of the method according to aspects of the invention.

A flow chart of a method according to the invention is illustrated in FIG. 4, with which the guide element 1 according to the invention can be produced. In a first step 100, a permittivity distribution is provided in the spatial expansion of the guide element. The permittivity distribution is attuned to the use of the guide element here.

In a further step 110, a corresponding material density distribution corresponding to the given permittivity course P is then specified. In order to be able to implement the material density distribution, a structure is specified that implements the material density distribution in a further step 120.

For specifying the structure, the guide element 1 is previously divided into elementary cells.

In the last step 130, the structure is then produced using a generative manufacturing method. It is preferred in specifying the structure to take into account that no higher-level structures are created that could unintentionally influence the electromagnetic radiation, since formation of the radiation is only to take place by varying the material density and, thus, varying the effective permittivity.

What is claimed is:

1. A guide element for an antenna for a fill level meter, wherein the guide element as a whole has a one-piece construction formed of a single dielectric material and is used for forming, guiding and emitting electromagnetic radiation, wherein the guide element has a variation in permittivity over a spatial expansion of the guide element for specifically forming the electromagnetic radiation, variations in material density of the single dielectric material producing said variation in permittivity, wherein the material density is defined as one portion of the dielectric material per elementary cell of a given size.

2. The guide element according to claim 1, wherein the dielectric material is arranged in an irregular structure or in a regular structure at least in a part of the elementary cells.

3. The guide element according to claim 2, wherein the permittivity is steady or unsteady at least over a part of the spatial expansion of the guide element.

4. The guide element according to claim 3, wherein the irregular structure or the regular structure is a Voronoi tessellation or a Delaunay tessellation of a space of the elementary cells.

5. The guide element according to claim 4, wherein the spatial distribution of the material density of the dielectric material is implemented by varying a wall thickness of the cells, of which the Voronoi tessellation or the Delaunay tessellation of the elementary cells consist.

6. The guide element according to claim 4, wherein the spatial distribution of the material density of the dielectric material is implemented by varying a density of the cells, of which the Voronoi tessellation or the Delaunay tessellation of the elementary cells are formed, while retaining a wall thickness of cells.

7. The guide element according to claim 2, wherein the irregular structure and the regular structure are formed by adjacent structure cells, wherein the size of the structure cells is variable in dependence on the size of the elementary cell in which the respective structure cells are located.

8. The guide element according to claim 1, wherein the guide element is produced using a generative manufacturing method.

9. The guide element according to claim 1, wherein the size of the elementary cell in one volume range is dependent on a gradient of the permittivity in the one volume range.

10. The guide element according to claim 9, wherein at least one of:
the size of the elementary cell is a smallest for a volume range that has a largest gradient of the permittivity; and
the size of the elementary cell is a largest for a volume range that has a smallest gradient of the permittivity.

11. The guide element according to claim 9, wherein:
the size of the elementary cell, in the statistical mean, averaged over the volume of the guide element, is larger where the gradient of the permittivity is smaller; and
the size of the elementary cell, in the statistical mean, averaged over the volume of the guide element, is smaller where the gradient of the permittivity is larger.

12. The guide element according to claim 7, wherein, in the statistical mean, the structure cells in larger elementary cells are greater than the structure cells in smaller elementary cells.

13. The guide element according to claim 9, wherein the size of the elementary cell in the one volume range is dependent on a maximum gradient of the permittivity in the one volume range.

14. A method for producing a guide element for an antenna for a fill level meter, wherein the guide element as a whole has a one-piece construction that is formed of a single dielectric material and forms, forwards, and emits a supplied electromagnetic radiation, the method comprising:
first, specifying a permittivity variation in a spatial expansion of the guide element that is attuned to use of the guide element for an antenna for a fill level meter,
then, specifying a corresponding variation of material density of the single dielectric material for producing the specified permittivity variation,
then, determining a structure that implements the c of the single dielectric material, and
then, producing the structure determined using a generative manufacturing method so as to have said one-piece construction formed of the single dielectric material having the specified permittivity variation.

15. The method according to claim 14, wherein the specifying the structure that implements the material density distribution comprises dividing the guide element into elementary cells, wherein the size of adjacent ones of the elementary cells can vary among one another.

16. The method according to claim 15, wherein the size of the elementary cell in one volume range is dependent on a gradient of the permittivity in the one volume range.

17. The method according to claim 16, wherein at least one of:
the size of the elementary cells is chosen as a smallest for a volume range that has a largest gradient of the permittivity variation; and
the size of the elementary cells is chosen as a largest for a volume range that has a smallest gradient of the permittivity variation.

18. The method according to claim 16, wherein:
the size of an elementary cell, in the statistical mean, averaged over the volume of the guide element is larger where the gradient of the permittivity is smaller; and
the size of an elementary cell, in the statistical mean, averaged over the volume of the guide element is smaller where the gradient of the permittivity is larger.

19. The method according to claim 18, wherein the size of the elementary cells are chosen so that the maximum permittivity or the maximum spatial permittivity gradient is translated into a proportional spatial point density, and the points are used as development points for a three-dimensional Voronoi partitioning of the volume of the guide element.

20. The method according to claim 16, wherein the size of the elementary cell in the one volume range is dependent on the maximum gradient of the permittivity in the one volume range.

* * * * *